Dec. 5, 1967  S. M. SHELTON ET AL  3,356,491

PURIFICATION OF CONTAMINATED REACTIVE METAL PRODUCTS

Filed July 26, 1966

Stephen M. Shelton
Henry Gordon Poole
Allen D. Abraham
INVENTORS

BY

Kolisch & Hartwell

Attys.

United States Patent Office 3,356,491
Patented Dec. 5, 1967

3,356,491
PURIFICATION OF CONTAMINATED
REACTIVE METAL PRODUCTS
Stephen Matheson Shelton, Henry Gordon Poole, and Allen Dethman Abraham, Albany, Oreg., assignors to Oregon Metallurgical Corporation, Albany, Oreg., a corporation of Oregon
Filed July 26, 1966, Ser. No. 567,876
7 Claims. (Cl. 75—84)

ABSTRACT OF THE DISCLOSURE

A method of purifying contaminated Group IV metal products and of processing such impurities, where the metal product is heated in a closed system to produce vaporization of the impurities. These vaporized impurities are mixed with an inert gas stream which flows into a condensing region in the closed system, and in such region the impurities are condensed to form solids that are then separated from the gas stream. These separated solids are collected in a separate collecting region in the system, and subsequently are heated to liquefy them, and the impurities are removed from the closed system by draining them in liquid form from such collecting region.

---

This invention relates to the manufacture of reactive metals, and more particularly to a method and apparatus usable in the purification of such metals.

Reactive metals, such as titanium, zirconium, hafnium, etc., may be prepared by reducing a compound of such metals, such as a halide thereof, with the production of the reactive metal in its free state and by-products, such as salts of the reducing material. To obtain the reactive metal free of contaminates, various procedures have been proposed including processes where the contaminates are vaporized and then removed in vaporous form. In a co-pending application entitled "Reduction and Purification of Reactive Metals," Ser. No. 498,500, filed Oct. 20, 1965, a process is described wherein purification is performed by heating a reactive metal product, including contaminates, in a retort to promote vaporization of the impurities, and sweeping the impurities in vaporous form from the retort with an inert gas. More specifically, this invention concerns improvements in such a process, which facilitates collection of the impurities as they are carried off from the region containing the metal product and recirculation of the inert gas.

Further explaining, and with specific reference to the production of titanium, it has been a practice to reduce a halide of such metal with a reducing metal, such as magnesium, sodium, potassium, etc. Thus, titanium tetrachloride, a liquid, may be added over a period of time to a batch of molten magnesium contained in a closed retort, with a reduction reaction taking place according to the following equation:

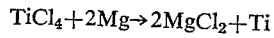

$$TiCl_4 + 2Mg \rightarrow 2MgCl_2 + Ti$$

In the reaction, there is formed a porous sponge of titanium, and mixed with this sponge and beneath the sponge the by-product magnesium chloride. It is customary to employ an excess of magnesium in the reduction reaction to minimize the formation of titanium subchlorides, so that some 10%–30% of the magnesium with which the retort is initially charged remains unreacted. Thus, in the retort where the reaction takes place, there will be found, in addition to titanium and magnesium chloride, minor amounts of subchlorides and magnesium. Much of this material may be tapped off while the same is in a molten state, but the titanium sponge being porous still contains a certain amount of entrapped material, including magnesium chloride and magnesium. Such a sponge may be subjected to the purification process of the invention to obtain free metal having a high degree of purity.

It has been proposed that the reduction of the metal be performed in a retort with the formation of a sponge product extending as a bed in said retort, and that an inert gas stream, such as a stream of argon or helium, be continuously circulated through the sponge bed after the reduction process and while heating of the metal product to effect removal of the impurities. Titanium has a considerably higher melting point than such materials as magnesium or magnesium chloride, and by heating the retort to a temperature above the melting point of the magnesium and the magnesium chloride, while maintaining such temperature below the temperature at which the iron of the retort and the titanium form a eutectic (approximately 1,085° C.), a rise in the vapor pressure of the impurities is realized which promotes the mixing of the impurities with the inert gas stream and withdrawal with the inert gas stream. To obtain most efficient purification, it is necessary that the impurities withdrawn be completely removed from the gas stream before the same is recirculated. In the removal of such impurities from the gas stream, it is important that such be done in a manner whereby clogging of the equipment is prevented (as by condensing of the materials with clogging of the conduits handling the gas stream). Further, where a large charge of the metal product is being purified, the amount of impurities collected may be considerable, and provision must be made for handling the collected product without the necessity of shutting down the equipment or in other ways interfering with the purification process in general. In this connection it should be remembered that the entire process is carried out in a closed system with an inert gas present which, of course, introduces problems in removing any material from the system without destroying the established environmental conditions within the system.

A general object of this invention, therefore, is to provide novel and improved means and apparatus for processing a gas stream employed in the purification of a reactive metal.

Another object is to provide improved purification apparatus for the treatment of a reactive metal facilitating the removal of impurities therefrom.

More specifically, an object of the invention is the provision of novel means for processing a gas stream in a closed system, where separation of impurities from the gas stream is brought about by first condensing the impurities to form solid particles, and then collecting and removing such particles.

Another object is to provide a method permitting the collection of condensates after their removal from a circulated gas stream in a closed system, and the further separation of these condensates according to their composition.

A particular feature of the invention is the provision of means for removing condensate material from a closed system, wherein the removal of the material from the system may be done without opening up the system to the atmosphere.

In the purification of titanium, and in a specific embodiment of the invention, it is contemplated that impurities such as magnesium and magnesium chloride be condensed as particles in a condenser section, and that such particles then be separated from the inert stream of gas which has transported the magnesium and magnesium chloride to the condenser section. These particles fall into a collecting region provided by a retort, and at a designated time the contents of such retort are heated to melt the collected particles with the magnesium and magnesium chloride forming pools of liquid. Molten magnesium floats on molten magnesium chloride, so as a result of melting the materials a separation results. The two constituents may then be collected and stored in separate receptacles through the expedient of draining one molten constituent exclusively of the other. The draining can be effected without opening up the retort or the remainder of the system to the atmosphere.

These and other objects and advantages are attained by the invention, and the same is described hereinbelow in conjunction with the accompanying drawings, wherein.

Figure 1:
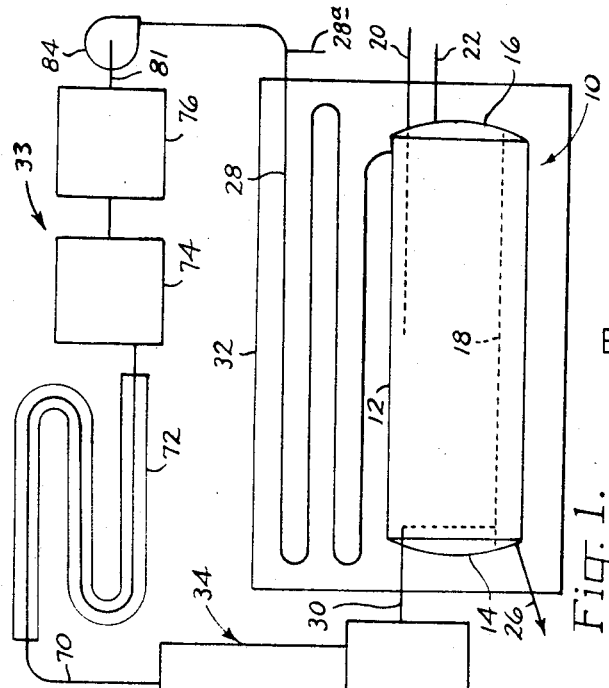
FIG. 1 is a schematic view illustrating, in simplified form, a particular embodiment of apparatus as contemplated by the invention, such as may be employed in the production and subsequent purification of a reactive metal.

Referring now to the drawings, and considering the apparatus as employed for the production and subsequent purification of titanium, indicated at 10 in FIG. 1 is an iron retort, such as may be utilized for holding the reactants during the reduction reaction, and as the vessel containing the reduction product during the purification part of the process. The retort may take the form of an elongated, hollow, cylindrical shell 12 which is closed off at its ends by the end walls 14 and 16. Within the retort a reactor grid, shown by the dotted outline 18, is provided. This grid is imperforate, to permit the passage of vaporous materials therethrough. The grid provides support for the initial charge of magnesium which is placed within retort 10 prior to initiating the reduction reaction.

Also illustrated schematically in FIG. 1 is certain piping provided for the purpose of introducing and withdrawing material from the retort. Thus, 20 represents a pipe extending into the retort that may be utilized for introducing liquid titanium tetrachloride. The tetrachloride is ejected from the pipe adjacent the top of the retort, and thence travels downwardly toward the magnesium deposit below with flashing of the tetrachloride into a vapor because of the temperature conditions involved. Shown schematically at 22 is a blow-off pipe used in controlling pressure conditions within retort 10. A conduit 26 connecting with the base of the retort provides a means for tapping molten material during the reduction reaction. At 28 is an infeed conduit through which inert gas is introduced to retort 10 and circulated through the retort during purification of the titanium product which forms as the result of the reduction reaction. Line 28a connecting with conduit 28 is for evacuating conduit 28 and retort 10, and back filling with an inert gas. An outlet conduit, shown schematically at 30, provides a path for such inert gas from the retort during this purification part of the process. Valves have not been specifically shown in the schematic drawing forming FIG. 1, however, it should be understood that all of the conduits described are provided with suitable valve means for controlling the flow of materials therethrough.

In the production of titanium sponge, and its subsequent purification, a certain amount of heat must be supplied to the retort, and such is done by placing the retort within the confines of a furnace, and through gas burners and the like heating the furnace. In FIG. 1 the rectangular outline 32 illustrated schematically the furnace that may be used for such purpose.

In a copending application of even date, entitled "Manufacture Including Purification of Reactive Metals," details of a retort and furnace, such as may be used in carrying out the invention, are set forth in some detail. It is not felt that a further description of the particulars of the retort and furnace construction is necessary for an understanding of the present invention.

Figure 2:
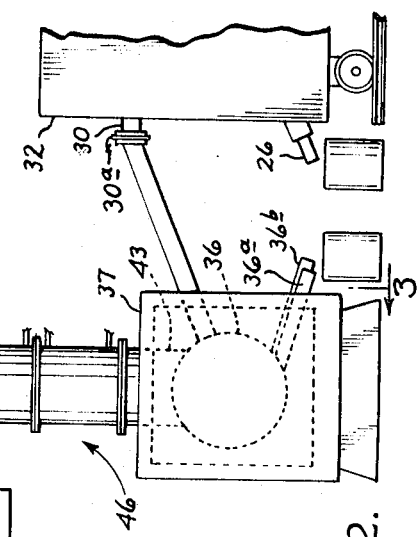
FIG. 2 is a side elevation of a hot condenser assembly provided in the apparatus shown schematically in FIG. 1.

In the purification of a titanium product produced in retort 10 by the reduction of titanium tetrachloride, an inert gas is circulated through retort 10, which gas functions to sweep impurities in vaporous form from the retort. The gas stream leaving the retort after sweeping of the retort is processed in gas treatment equipment generally indicated at 33, in a manner whereby impurities in the gas stream are condensed to form solid particles and then separated from the gas stream permitting the recirculation of the gas. Additional reference is now made to FIGS. 2, 3, and 4 which further illustrate various portions of such equipment.

More specifically, positioned adjacent retort 10 outside furnace 32 is what is referred to herein as a hot condenser assembly 34. Adjacent the base of assembly 34 is an elongated generally cylindrical retort, referred to herein as a collecting retort, designated at 36. Retort 36 functions to define a collecting region for impurities during the purification part of the process. Outlet conduit 30 described in connection with retort 10 connects with retort 36 to provide a path for the flow of inert gas from retort 10 to retort 36.

It should be understood that during the reduction of titanium tetrachloride, retorts 10 and 36 are isolated from each other by placing a plate 30a in conduit 30 which spans the conduit and closes it off between its ends. This plate is removed during the purification part of the process to connect the two retorts through conduit 30.

Further considering the condenser assembly 34, retort 36 is lodged within the confines of a furnace 37. This furnace has walls made of the usual refractory furnace lining material, and is provided with suitable gas burners (not shown) permitting heating of the interior of the furnace.

A pair of tap conduits are shown at 36a, 36b, which connect with retort 36 adjacent its base. The conduits project out from furnace 37, and are for draining molten material from the retort. Suitable valve means (not shown) control flow of material through the tap conduits.

Projecting upwardly from the top of retort 36 are multiple stacks shown at 42, 44, and 46. These stacks are similar in construction, and only one will be described in detail.

Thus, and considering stack 46, the stack is hollow and provides a passage for gas and any other material carried by said gas upwardly through the interior of the stack. The base of the stack communicates through a cylindrical section 43 with the interior of retort 36. Mounted, one on top of the other above section 43, are multiple water jacketed condenser sections shown at 45. Pipes, such as those shown at 47, circulate cooling water through these water jacketed condenser sections. Supported above the condenser sections are a filter base 48, and a filter housing 49, each of which is also water jacketed, for cooling purposes.

Figure 4:
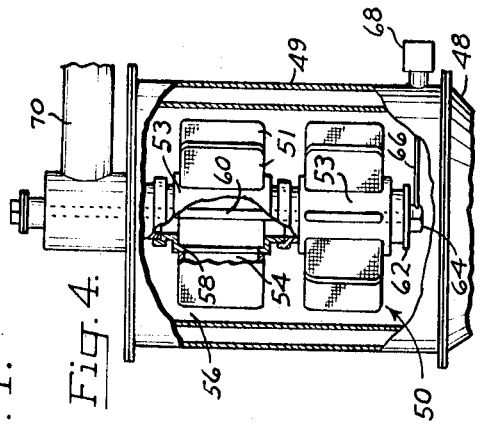
FIG. 4 is a view, on a slightly enlarged scale and with portions broken away, illustrating in further detail a filter unit which forms part of a stack in the condenser assembly.

Referring now in particular to FIG. 4, the filter housing 49 has mounted within it a hot filter unit, such as that indicated generally at 50. The filter unit illustrated is a leaf-type filter unit, and includes folds of filter cloth, such as those shown at 51, mounted on and projecting radially outwardly from a hollow pipe section 53. Each fold of filter cloth encompasses a space 54 which is separated from the interior 56 of the filter housing by the cloth. Spaces 54 communicate with the inside of pipe section 53 through a slot formed in the pipe section, such as the one shown at 58. From this description, it should be obvious that gas flow is permitted upwardly in the stack into interior 56 of the filter housing and thence through the folds of filter cloth to the interior of pipe section 53 (which interior is also referred to herein as a receiving region for was noted disposed over reactor grid 18 comprising pure titanium containing not more than about 0.1% chlorine.

During the initial hours of purification by sweeping with an inert gas, some molten impurities tend to collect as a pool at the base of the retort, which may be removed by tapping the retort.

As the result of the purification process, a considerable amount of impurities as solid particles had collected in retort 36. This material consisted essentially of magnesium and magnesium chloride. These materials were reduced to molten form by operation of furnace 37 and heating of retort 36 to a temperature of about 750°.

With melting of the impurities a separation occurred within retort 36 by the formation within retort 36 of a molten pool of magnesium floating on a molten pool of the more dense magnesium chloride. This molten material was removed from retort 36 through draining from retort 36 first the heavier magnesium chloride, and then the lighter magnesium. In the draining, tap conduits 36a, 36b were employed. Each material was collected in separate receptacles placed underneath the protruding ends of the tap conduits.

It will be noted that two tap conduits have been illustrated, with one, namely conduit 36b, communicating with the interior of retort 36 at a slightly higher elevation than the other namely conduit 36a. By providing two conduits, a pure magnesium product may be recovered by draining with the lower of the tap conduits sufficient magnesium chloride to place the level of the bottom of the pool of magnesium below the intake end of the upper tap conduit 36b.

It will be noted that the purification method contemplated, wherein impurities are separated out from the gas stream as solid particles, which are collected in a retort and subsequently removed from this retort in molten form, has a number of unique advantages. A relatively large volume of impurities may be collected, as it is a relatively simple matter to provide a retort 36 of large capacity for collecting the impurities separated out from the gas stream in each of the stacks. By providing multiple stacks communicating with the common retort, the flow of gas from retort 36 is through parallel streams with each stack providing efficient cooling of the portion of the total gas stream which is circulated by pump 84. By providing a common region of collection for the product separated out by the various stacks, in the form of retort 36, removal of the separated product from the system is facilitated.

The method contemplated also permits the separation according to chemical composition of the condensate product separated out by the hot filter units, through melting of the product and the formation of a molten pool of magnesium separate from and floating upon a molten pool of magnesium chloride. With such separation produced by the melting, the collection of one constituent free of the other is readily performed. The need to process the condensate product in separate processing equipment to yield a magnesium product suitable for reuse in the subsequent reduction of additional titanium tetrachloride is eliminated.

The product separated by the gas treatment equipment may be removed from the hot condenser assembly without opening up the assembly to the atmosphere. If desired, removal of the product can be performed simultaneously with carrying out the purification by sweeping with inert gas, through heating of retort 36 to produce liquefaction of its contents simultaneously with circulation of inert gas through retort 10 and condensing of impurities to form solids thereof in the condenser sections of the stacks.

While an embodiment of the invention has been described, obviously changes and variations are possible without departing from the invention. It is desired to cover all such modification and variations as would be apparent to one skilled in the art, and that come within the scope of the appended claims.

It is claimed and desired to secure by Letters Patent:

1. A method of purifying a contaminated Group IV metal product containing impurities melting at a melting point below the melting point of the metal in said product and of processing such impurities, comprising heating the metal product while in a closed system to a temperature below the melting point of the metal to produce vaporization of the impurities, mixing such vaporized impurities with an inert gas stream, passing such stream of gas together with impurities into a condensing region in said system and there condensing the impurities to form solids thereof which separate from said stream, collecting said separated solid impurities in a collecting region in said system separate from said condensing region, heating said separated impurities in said collecting region thus to liquify them, and removing said impurities from said closed system by draining them while in liquid form from said collecting region.

2. The method of claim 1, wherein the impurities comprise at least two principal constituents, and a separation of these constituents is effected in the closed system after they are liquefied.

3. The method of claim 2, wherein the two principal constituents have different densities when liquefied, and separation of the two constituents occurs through floating of one on the other upon the impurities being liquefied.

4. The method of claim 3, wherein the impurities are removed from the closed system selectively, with draining of one impurity substantially exclusively of the other while separated in said collecting region from the other impurity.

5. The method of claim 1, wherein the impurities are liquefied in said collecting region and removed by draining from the region simultaneously with condensing of the impurities to form solids in the condensing region.

6. The method of claim 1, wherein the metal product comprises titanium contaminated with impurities comprising as principal constituents magnesium chloride and magesium, and vaporization is performed by heating the product to a temperature above the melting point of magnesium chloride to produce vaporization of both.

7. The method of claim 6, wherein separation of the magnesium chloride and magnesium is produced in the collecting region by heating to produce a liquid pool of magnesium which floats on a liquid pool of magnesium chloride, and magnesium chloride is drained off first, followed by draining of magnesium.

References Cited

UNITED STATES PATENTS 2,773,787 12/1956 Rick _____ 75—84 X
2,817,585 12/1957 Winter _____ 75—84 X CARL D. QUARFORTH, *Primary Examiner.*

BENJAMIN R. PADGETT, *Examiner.*

M. J. SCOLNICK, *Assistant Examiner.* gas). Solid particles, however, are prevented from passing through the filter folds and collect on the other surfaces of the folds.

In FIG. 4, two pipe sections 53 are illustrated, each of which mounts folds of filter cloth as described. The pipe sections are mounted in place within the filter housing through a rod 60 passing up through the interior of the pipe sections, a retainer 62 abutting the underside of the lowermost pipe section, and a nut 64 screwed onto the lower end of rod 60. Joined as by welding to nut 64 is a rod 66 which extends outwardly to one side of the filter housing. This rod connects with vibrator mechanism illustrated generally at 68, and functions to transmit vibrations produced by actuation of mechanism 68 to nut 64, rod 60, and the filter unit supported by the rod. In carrying out the invention, it has been found advantageous periodically to shake the filter unit, whereby particle material which has collected on the outer surfaces of the folds of filter cloth may be loosened to fall by gravity down the stack with clearing of these outer surfaces.

A conduit or pipe 70 adjacent the top of stack 46 communicates with the interior of pipe sections 53 and provides a path for the flow of gas away from the top of the stack. This conduit, which also receives gas flowing from the other stacks, extends away from the stacks and passes through an elongated water jacket, portions of which are shown at 72 in FIG. 3. Water jacket 72 is provided to perform additional cooling of the inert gas stream leaving the stacks prior to the gas in such stream passing through one or more cold filters illustrated schematically in FIG. 1 by the boxes designated at 74, 76.

Figure 3:
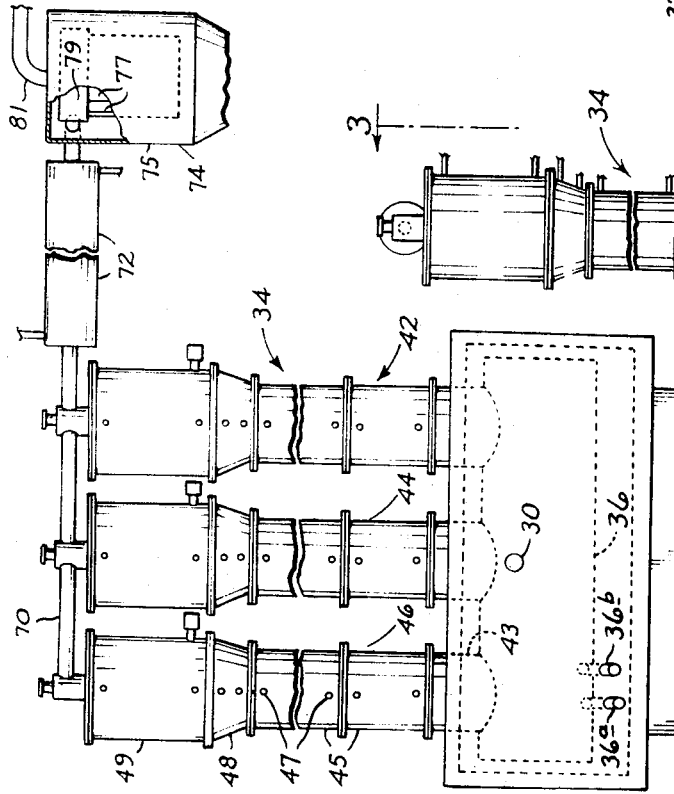
FIG. 3 is a view taken generally along the line 3—3 in FIG. 2, further illustrating the hot condenser assembly, and showing multiple stacks projecting upwardly from a retort in the assembly.

The construction of a cold filter is shown in more detail in FIG. 3. Each may include a housing, such as the one shown at 75, and within the housing a leaf-type filter unit comprising folds of filter cloth, such as those indicated at 77. Each fold of filter cloth encloses a space for receiving gas which communicates with the interior of a shield shown at 79. Conduit 81 projecting down and through the top of the filter housing communicates with the interior of the shield 79 to provide for the flow of gas out from the filter unit. Any remaining solid particles entrained in the gas entering the cold filter collect on the outer surfaces of the folds of the filter cloth, while the gas which carried the particles into the unit passes through the filter cloth and thence out of the unit through conduit 81.

Referring again to FIG. 1, a pump is provided, shown at 84, which has its intake connected to conduit 81. The pump exhausts into conduit or pipe 28 earlier described as the infeed conduit for retort 10.

An example illustrating the preparation of a purified titanium product, using the apparatus illustrated and the method contemplated by this invention, will now be described.

Initially a charge of about 16,000 pounds of magnesium was placed within retort 10, with such magnesium in the form of magnesium bricks. These bricks were placed on the top of gride 18, and the retort was closed by welding its end walls 14, 16 in place. Plate 30a was mounted in a position closing off conduit 30 so as to isolate retort 10 from retort 36. Required valve adjustments were made to produce a closed system in retort 10. The retort was then evacuated and back filled with helium through line 28a to produce a pressure of 0.5 p.s.i.g. within the retort.

With the retort placed within furnace 32, the furnace was started, and the temperature of the walls of the retort raised to about 800° C. Such heating produced a pool of molten magnesium from the magnesium bricks. With the magnesium in molten condition, approximately 46,700 pounds of liquid titanium tetrachloride was then fed into the retort through pipes such as pipe 20, at an initial rate of about 1,000 pounds per hour for the first few hours, which rate was then increased to about 3,000 per hour. The time required for the addition of the tetrachloride was about 17 hours. During this addition of titanium tetrachloride, the walls of retort 10 were maintained at a temperature ranging between about 800–920° C. Inert gas, i.e. helium, was bled from the retort through blow-off pipe 22, so as to maintain the pressure within the retort below about 3.5 p.s.i.g.

After about 60% of the titanium tetrachloride had been added, and the lapse of about 10 hours, molten by-product magnesium chloride which had formed as a pool underlying the molten pool of magnesium was drained from the retort through conduit 26. The draining of the molten magnesium chloride was effective to lower the surface of the molten pool of magnesium which floated on the molten salt in a region extending from the top of the reactor grid 18 to a level some 10 to 24 inches above the top of this grid.

At the conclusion of the addition of all the titanium tetrachloride, the retort was allowed to sit while heated during a soak period of about three hours, during which time any residual tetrachloride vapors within the retort were allowed to react. With the conclusion of the soak period, all molten material in the retort not retained by the sponge was tapped through conduit 26. About 12,200 pounds of titanium sponge had formed in the retort which was distributed as a thick bed of about 14 inch thickness over the reactor grid. Estimated to be contained in the sponge was about 4,000 pounds of unreacted magnesium, and 4,000 pounds of impurities principally comprising magnesium chloride.

Upon the completion of the reduction reaction, and after draining of all magnesium chloride, and with gas treatment equipment 33 evacuated and backfilled with helium (normally such equipment is already standing in a ready state), plate 30a was removed from conduit 30 to connect retort 10 with retort 36. Suitable valve adjustments were made to make equipment 33, including the hot condenser assembly, conduit 70, the cold filters and pump 84, part of a single closed system with retort 10. Pump 84 was then started to produce circulation of helium through conduit 28, retort 10, conduit 30, the hot condenser assembly and the cold filters back to the pump. A gas flow through conduit 28 resulted of approximately 1,000 cubic feet per minute. A pressure on the downstream side of the pump of about 4 p.s.i.g. was sufficient to produce proper circulation and pressure conditions within retort 10.

During the circulation of the inert gas through the equipment, furnace 32 was heated to maintain a temperature in retort 10 of about 1,025° C. The hot gas flowing from retort 10 into retort 36 resulted in a rise in the temperature of retort 36 to about 400° C. The temperature of the helium gas leaving the hot filters in conduit 70 was noted to be about 300° C. This inert gas after passing through the water jacketed region of conduit 70 and the cold filters was found to have a temperature on entering the pump of about 65° C., which temperature was low enough to prevent any heat damage to the pump.

Purification of the titanium within retort 10 through sweeping of inert gas through the retort was continued for approximately 60 hours. During this time the impurities in the form of magnesium, and magnesium chloride collected within the hot condenser assembly and to a very minor degree within the housings of the cold filters. Periodically during this 60-hour period, inert gas flow was stopped by stopping pump 84, and the vibratory mechanisms exemplified by a mechanism 68, actuated to produce shaking of the filter units within the hot filters, with this being effective to loosen solid particles of impurities that had collected on the outer surfaces of the folds of filter cloth in these units, whereby these particles fell down to be collected in retort 36. At the conclusion of the purification process, the furnace for retort 10 was shut off and the retort cooled to 600° C. The retort was then removed from furnace 32 and permitted to cool to room temperature. Air was then gradually admitted to retort 10 to condition the sponge therein. Afterwards the end walls were removed, and a bed of titanium sponge